United States Patent [19]

Cable et al.

[11] 4,108,407

[45] Aug. 22, 1978

[54] ADJUSTMENT DEVICE

[75] Inventors: Walter Lester Cable, Freehold; Derek Sidney Binge, Hamilton Square; Rudolph Francis Korosec, Manville, all of N.J.

[73] Assignee: RCA Corporation, New York, N.Y.

[21] Appl. No.: 595,806

[22] Filed: Jul. 14, 1975

[51] Int. Cl.² .............................................. F16F 5/00
[52] U.S. Cl. ..................... 248/23; 248/179; 248/188.4
[58] Field of Search .............. 248/13, 14, 16, 19, 248/23, 25, 188.4, 178–186, 500, 2; 85/50 C

[56] References Cited

U.S. PATENT DOCUMENTS

| | | | |
|---|---|---|---|
| 944,461 | 12/1909 | Olander et al. | 248/23 X |
| 1,295,937 | 3/1919 | Stafford et al. | 85/50 C |
| 1,869,984 | 8/1932 | Sklarek | 248/181 UX |
| 2,439,194 | 4/1948 | Wild | 248/181 |
| 2,911,169 | 11/1959 | Contreras | 248/13 |
| 2,940,784 | 6/1960 | Fell | 248/180 X |
| 3,045,389 | 7/1962 | Arnit | 248/188.4 |
| 3,335,987 | 8/1967 | Woolslayer et al. | 248/23 |
| 3,356,324 | 12/1967 | Attermeyer | 248/25 X |
| 3,361,410 | 1/1968 | Messer | 248/188.4 UX |
| 3,424,413 | 1/1969 | Applegate | 248/23 |
| 3,669,393 | 6/1972 | Paine et al. | 248/188.4 |
| 3,890,758 | 6/1975 | Bouchard | 248/23 X |
| 3,897,139 | 7/1975 | Caruolo et al. | 248/477 |
| 3,971,537 | 7/1976 | Winkle et al. | 248/188.4 X |

Primary Examiner—Lawrence J. Staab
Attorney, Agent, or Firm—H. Christoffersen; Samuel Cohen; William Squire

[57] ABSTRACT

An adjustment device includes an internally threaded tubular body having means for securing the body to a first member. A hollow externally threaded tubular body is mounted in threaded engagement with the internally threaded body for adjusting the spaced relationship of the first member with a second member. The externally threaded body has spherical seats disposed at opposite ends thereof. Mounted in the spherical seats are the complimentary spherical seats of a pair of washers, one washer being mounted at each end of the externally threaded body. An elongated threaded screw is mounted within the externally threaded body and extends through the washers. A head at one end of the elongated screw engages one of the washers while the thread at the other end of the screw engages the second member for securing the washers and externally threaded body and thus the first member to the second member.

12 Claims, 2 Drawing Figures

ADJUSTMENT DEVICE

BACKGROUND OF THE INVENTION

The present invention relates to devices for adjusting the spaced relationship between first and second members.

In the adjustment of optical elements in optical systems, critical alignment of the various optic elements is a factor which must be considered in making the adjustments. To accomplish this alignment, sensitive adjustment devices are used for orienting and displacing one or more of the optic elements in the system. This may be accomplished by mounting one or more of the elements on a plurality of adjustable legs such that adjustment of any one of the legs results in a corresponding orientation adjustment.

However, the problem with such adjustment devices is that they are usually accomplished by means of threaded screws. As is well known, threaded screws accomplish displacements in only one direction, that is, by a translation motion. It is apparent that while a linear motion is transmitted to the device being adjusted, the fixed relationship of the other mounting points on the device pivots the device during adjustment causing a lateral displacement of the device during the adjustment process. Therefore, in critical alignment arrangements such as are present in spacecraft apparatus wherein various sensors, motors and the like are aligned to a single axis, shims are utilized to provide the proper adjustment of the different apparatus involved. This is cumbersome and difficult, especially in a spacecraft where access to the adjustment devices may be hampered when the device to be adjusted is disposed in an enclosed structure. The adjustment devices, when of the screw-type, may also cause undesirable lateral stresses in the item being adjusted due to the lateral displacement. Such stresses cannot be tolerated in a spacecraft environment due to the extreme launch stresses since they may cause shifting of the optical alignment of the various adjusted apparatus during launch, causing failure of the mission.

SUMMARY OF THE INVENTION

An adjustment device for orienting a first member with respect to a second member comprises a body having a spherical seat disposed on one surface thereof. Means are coupled to the body for adjustably securing the body to the first member so that the body translates in a first direction. A support member is provided having a spherical seat complimenting and contiguous with the spherical seat on the body. Securing means extend through the body and the support member and are arranged to engage the body and the second member to secure the support member between the body and the second member, whereby the second member is oriented with respect to the first member when the body is translated in the first direction.

IN THE DRAWINGS

DETAILED DESCRIPTION

Figure 1:
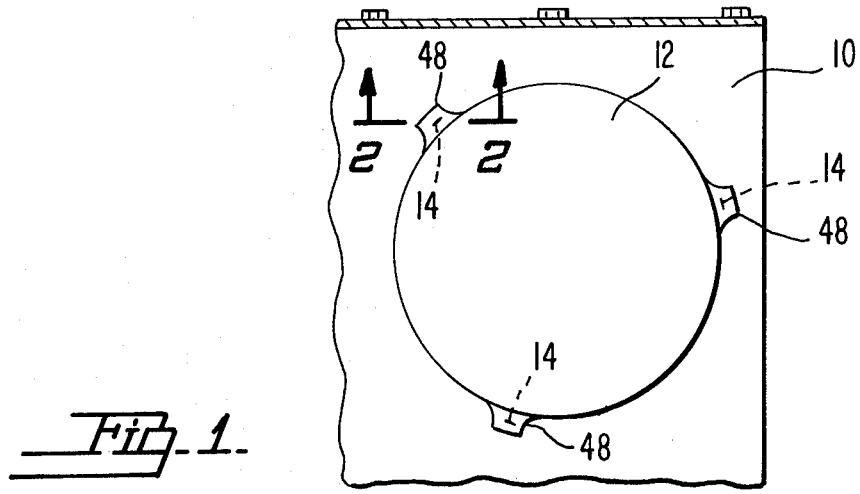
FIG. 1 is the plan view of a drive means mounted on a spacecraft structure utilizing an adjustment device constructed in accordance with an embodiment of the present invention.

FIG. 1 shows a portion of a spacecraft structure 10 having mounted on panel 20 a momentum wheel assembly 12 which is a stabilizing device used in a well known manner in conventional spacecrafts. Assembly 12 must, in accordance with spacecraft technology, be aligned with a predetermined axis (not shown) on the spacecraft 10. Additional apparatus such as thrusters (not shown), sensors (not shown), and other devices (not shown) are similarly required to be oriented to the same axis on the spacecraft 10. This alignment procedure permits the spacecraft to operate these various devices in a meaningful manner through their common orientation. The assembly 12 is secured in spaced relationship to the spacecraft 10 by three adjustment device assemblies 14. Adjustment device assemblies 14 serve as adjustable mounting legs for the assembly 12. Assembly 12 is of the type which must be aligned with the predetermined spacecraft axis after being enclosed within the spacecraft structure.

Figure 2:
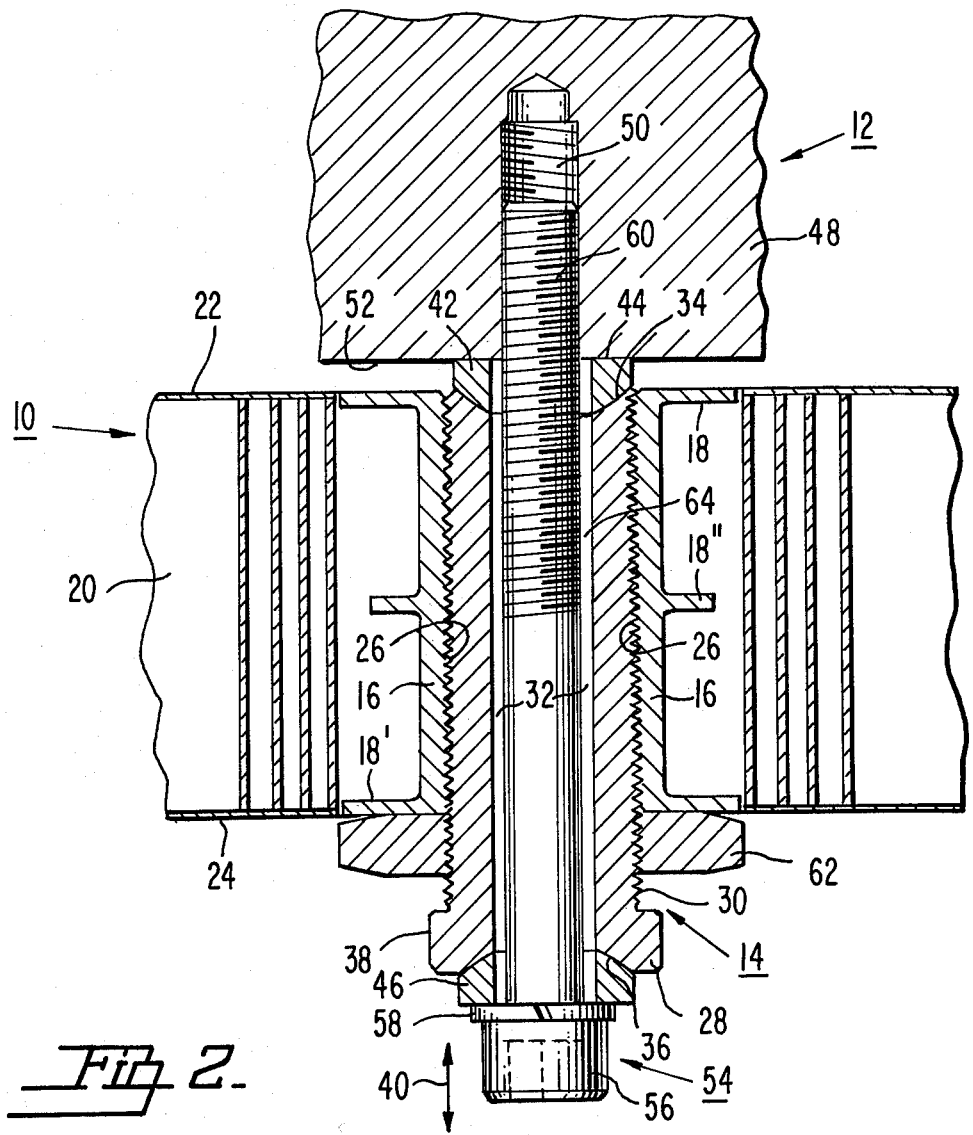
FIG. 2 is a sectional elevational view of the adjustment device of FIG. 1 taken along line 2—2.

In FIG. 2, there is illustrated an enlarged sectional view of one of the assemblies 14 which shows a typical construction of all of the assemblies 14. Assembly 14 illustrates an embodiment of the present invention and comprises an outer tubular insert member 16. Member 16 includes a plurality of annular flanges 18, 18' and 18''. Flanges 18, 18' and 18'' serve to secure the insert member 16 to suitable honeycomb panel 20 as used in spacecraft structures. The detailed construction of honeycomb panel 20 and spacecraft 10 are not a part of the present invention. Other suitable fastening means instead of flanges 18, 18' and 18'' may be used to secure insert member 16 to the honeycomb panel 20.

Insert member 16 is an elongated sleeve having an internally threaded bore produced in a manner well known in the screw machining art. Flanges 18 and 18' are mounted flush with the outer respective surfaces 22 and 24 of panel 20. Mounted in threaded engagement with the internal thread 26 of member 16 is externally threaded adjustment member 28. External thread 30 on member 28 mates with, and is mounted to, the internal thread 26. Threads 26 and 30 are fine threads for providing extremely fine adjustment increments to adjustment member 28. Centrally disposed within member 28 is an axially extending bore 32. Bore 32 extends completely through, and in communication with, both ends of member 28. Disposed at opposite ends of member 28, in communication with the bore 32, are spherical seats 34 and 36. Seats 34 and 36 are concave. One end of member 28 is formed into multifaceted nut 38. Nut 38 provides convenient means for turning member 28 with respect to the insert member 16 to provide an axial adjustment in the direction of arrow 40. The threaded insert member 16 and threaded adjustment member 38 are preferably made out of a titanium alloy.

Mounted in seat 34 is spherical washer 42. Washer 42 has a planar surface 44 on one side and a spherical seat on the other side mounted in, and complimentary to, seat 34. Disposed on seat 36 is washer 46. Washer 46 has a planar surface on one side similar to surface 44 of washer 42 and a spherical seat on the opposite side which is complimentary to, and mounted on, seat 36. Washers 42 and 46 are free to float in respective corresponding seats 34 and 36.

Momentum wheel assembly 12 has a boss portion 48 having a threaded hole 50 therein. A portion of boss 48 at surface 52, adjacent hole 50, is made planar for abutting the planar surface 44 of washer 42. Disposed within the bore 32 of adjustment member 28 and the holes of washers 42 and 46 is locking screw 54. Screw 54 has a head 56 which overlaps and engages a lock washer 58. Lock washer 58 engages the planar surface of washer 46, as shown. The end of screw 54 opposite the head 56 has a threaded portion 60. Threaded portion 60 is received in threaded hole 50. Locking nut 62 is disposed on the threaded portion of member 28 for locking member 28 to insert member 16 at flange 18'.

A separate, different device 14, as illustrated in FIG. 2, is disposed in three positions on the momentum wheel assembly 12 as shown in FIG. 1.

As provided in accordance with the present invention, adjustment device assembly 14 permits not only the displacement and orientation of assemblies such as assembly 12, but permits such orientation and displacement to occur by an operator disposed on the opposite side of panel 20 on which assembly 12 is mounted. As a result, blind adjustments may be made to assembly 12 by an operator to precise alignment requirements without any distortions or subsequent shifts in alignment and without the use of shims.

In operation, locking nut 62 is loosened to permit rotation of the adjustment member 28. Locking screw 54 is screwed taut by suitable means, tightly clamping washers 46, 42 and member 28 against boss portion 48. With a suitable wrench, member 28 is rotated by way of nut 38. Suitable optical means, such as a mirror or the like (not shown), can be mounted on the assembly 12 and disposed adjacent a suitable hole or other optical transmission means in honeycomb panel 20. The alignment of assembly 12 is thus optically observed by an operator located on the side of panel 20 adjacent nut 38. This permits an operator to precisely align assembly 12 even though assembly 12 is completely enclosed.

Locking screw 54 may be maintained in a tightly taut position during the final stages of adjustment due to the small increment of alignment necessitated at this time.

Washers 42 and 46 act as bearings during the alignment when member 28 is rotated. It is to be understood that the course adjustment is made with the locking screw 54 in a loose state. By rotating member 28 in the appropriate clockwise or counterclockwise direction, assembly 12 is axially displaced in the direction of arrow 40 and may also be slightly laterally displaced due to the pivoting action of member 12 about the other devices 14 caused by this axial displacement. However, washers 42 and 46 slip slightly in their corresponding spherical seats. This action permits the tilting of the assembly 12 during the axial displacement. At the same time, good physical contact between members 28 and 16 through washers 42 and 46 is maintained. The slight tilting of assembly 12 during the final adjustment causes a slight lateral shift in screw 54. This lateral shifting of screw 54 is permitted by the clearance spacing 64 between screw 54 and the inner wall of bore 32.

The amount of clearance and the tautness of screw 54 is not critical and may be readily determined by one skilled in the machine assembly art in accordance with a particular application. Screw 54 on the other adjustment device assemblies 14 mounted on assembly 12 during the adjustment of one of the assemblies 14 is torqued an amount sufficient to maintain a tight assembly while permitting appropriate washers 42 and 46 to slip during the lateral displacement of member 28. This procedure is also not critical and is readily determined by one skilled in this art.

What is claimed is:

1. An adjustment apparatus comprising:
a first member,
a second member, and
a plurality of adjustment devices secured in spaced relationship to said first and second members for orienting said first member with respect to said second member and providing the sole support between said first and second members,
each said adjustment devices comprising,
a body having a first concave spherical seat disposed on one surface thereof and a second concave spherical seat disposed on a second surface thereof on a side opposite said one surface,
means coupled to said body for moveably securing said body to said first member so that said body translates in a first direction with respect to said first member,
a first support means having a spherical seat complementing and contiguous with said first spherical seat,
a second support means having a spherical seat complementing and contiguous with said second spherical seat, and
securing means extending through and spaced from said body and from each of said support means and in engagement with said second member for securing each of said support means and said body to said second member and for clamping said first and second support means to said body, whereby said second member is oriented with respect to said first member when said body is translated in said first direction without substantial stresses in said devices and members.

2. The device of claim 1 wherein said body and said support means have aligned respective hollow cores, said securing means including means extending through said aligned hollow cores for securing said body to said second member.

3. The device of claim 1 wherein said spherical seats are each defined by a locus of points spaced from each other.

4. The device of claim 1 wherein said body is an elongated hollow externally threaded sleeve and said securing means is an elongated screw.

5. In combination:
a first member,
a second member,
a plurality of bodies each having first and second concave spherical seats formed in respective corresponding opposite surfaces thereof,
means coupled to each of said bodies and to said first member for translating each said body in a given direction with respect to said first member,
a plurality of support means, each corresponding to one of said spherical seats, each support means having a spherical seat complementing and contiguous with the corresponding body spherical seat, and
means coupled to said first and second members and extending through corresponding ones of said support means and bodies for compressively securing said support means to the respective corresponding bodies and said second member.

6. The combination of claim 5 wherein said bodies are hollow sleeve-like screws and said support means include hollow disk-like members, said compressively securing means including means extending through the hollows of said screws and disk-like members for clamping said disk-like members and each said corresponding bodies to said second member, said translating means including a threaded bore in said first member for receiving the threads of corresponding separate, different ones of said hollow screws.

7. In combination:
a first member,
a second member, pivotally mounted to said first member,
a body moveably secured to said first member and having a first spherical seat formed in a surface thereof facing said second member in a first concave direction, and a second concave spherical seat disposed on a surface thereof opposite the surface facing said second member,
means coupled to said body and said first member for translating said body in a given direction with respect to said first member,
a first support means having a seat complementing and contiguous with said first body seat, said first support means being disposed between said body and said second member,
a second support means mounted in said second seat,
each of said support means and said body having hollow cores, and
means connected to said first and second members for securing said first member to said second member at said body.

8. The combination of claim 7 wherein
said securing means includes elongated fastening means having a head at one end for engaging said second support member and means for engaging said second member at the other end for clamping said support members and said body to said second member.

9. The combination of claim 8 wherein said body and said first member have complimentary engaged screw threads.

10. An adjustment device for displacing a first member with respect to a second member comprising:
a body having a hollow core extending therethrough in a first direction in communication with oppositely disposed surfaces of said body, said body including means for moveably securing said body to said first member in said first direction, said body having a concave spherical seat disposed at each of said ends and surrounding said core at said ends,
first and second support elements, each support element having a spherical seat disposed on one side thereof complimenting and contiguous with a corresponding, separate, different one of said spherical seats on said body, said support elements each having a hollow core extending therethrough and in communication with the spherical seat on that support element, and
a fastening member disposed in said hollow cores of said support elements and said body, said fastening member including means for securing said body and said support elements to said second member, the displacement of said body in said first direction tending to cause displacement of said second member in a second different direction, said second member being free to move in said second direction in response to said first direction displacement thereby alleviating any stresses which might otherwise occur in said first or second members due to said displacement in said second direction.

11. In an arrangement which includes a supporting means, an element secured to the supporting means by a plurality of adjusting devices which permit the element to be moved toward and away from the supporting means and when one of said adjusting devices is adjusted relative to the other of said adjusting devices, the element tends to move a slight amount in a direction lateral to the adjustment direction thereby creating stresses between the element and the adjusting devices where the two meet, an improved arrangement in which said stresses are minimized comprising:
each of said adjusting devices comprising;
an elongated cylindrical member having a hollow core extending along the length thereof and an external screw thread, a concave spherical seat disposed at opposite ends of said member,
first and second washers each having a spherical seat complementing a separate, different one of said member seats, each of said washers having its spherical seat disposed in a different one of said member seats,
a rod extending through said washers and said cylindrical member, said rod having a washer retaining head at one end for securing one of said washers to said member and fastening means disposed at the other end for securing said rod to said element, and
a tubular adapter having an internal screw thread arranged to receive the external screw thread of said cylindrical member, said adapter being arranged to be secured to said supporting means.

12. The combination with a first member formed with an internally threaded aperture and a second member whose position it is desired to adjust relative to the first member in the direction of the axis of the aperture, of a supporting arrangement which makes such relative movement possible, wherein said supporting arrangement comprises:
a hollow first bolt formed with external threads for engagement with the internal threads of said aperture, said bolt being formed with spherical end surfaces of generally concave shape;
two washers, each formed with a spherical surface which mates with an end surface of said first bolt, one washer seated in one end surface of said bolt and the other seated in the other end surface of the first bolt;
means including a threaded opening forming a part of said second member;
a second bolt located within the hollow first bolt, the second bolt being of smaller diameter than that of the hollow portion of said first bolt and being spaced from the first bolt throughout its length, said second bolt including a head at one end which abuts one of said washers and being formed with threads at its other end which are engaged with the threads of said threaded opening, said other end of said second bolt being positioned such that said means forming part of said second member bears against the other of said washers.

* * * * *